United States Patent Office 2,955,071
Patented Oct. 4, 1960

2,955,071

INSECTICIDAL COMPOSITION COMPRISING AN ACYLATED PIPERAZINE AND A MEMBER OF GROUP OF PYRETHRIN AND ALLETHRIN

Joseph J. McGrath, Pittsburgh, Pa., assignor to Gulf Research & Development Company, Pittsburgh, Pa., a corporation of Delaware No Drawing. Filed July 7, 1958, Ser. No. 746,672

8 Claims. (Cl. 167—24)

This invention relates to insecticidal compositions.

Due to their excellent toxicity, pyrethrin and allethrin insecticide toxicants are widely used in insecticidal compositions. Allethrin is a commercially available synthetic product similar chemically to the naturally occurring pyrethrins. However, because of the high cost of the pyrethrin and allethrin toxicants, it is desirable to employ with them, materials which enhance their insectidal action and thereby obtain greater economy in the preparation of insecticidal compositions.

I have now found that the effectiveness of insecticidal compositions containing pyrethrin or allethrin insecticide toxicants can be materially increased by the incorporation therein of certain acyl derivatives of piperazine and alkyl substituted piperazines. Thus, the present invention provides improved insecticidal compositions comprising a pyrethrin or an allethrin insecticide toxicant, a solvent therefor, and the herein disclosed acyl derivatives of a piperazine.

The acyl derivatives of piperazine and alkyl-substituted piperazines which have been found to enhance the insecticidal properties of pyrethrin and allethrin insecticide toxicants are represented by the following general formula:

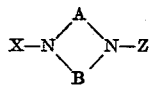

wherein A and B are selected from the class consisting of unsubstituted ethylene radicals and ethylene radicals having from 1 to 4 short chain alkyl substituents of not more than four carbon atoms each, X and Z are acyl radicals of aliphatic carboxylic acids containing from 3 to 15 carbon atoms. A preferred group of compounds within this general class is represented by those compounds wherein the X and Z substitutents contain between 6 and 10 carbon atoms, i.e., wherein each acyl group is derived from an aliphatic carboxylic acid containing between 6 and 10 carbon atoms.

Representative compounds of the invention include N,N'-dipropionylpiperazine, N,N'-dipropionyl tetra ethylpiperazine, N-propionyl N'-lauroylpiperazine, N,N'-dibutanoylpiperazine, N-butanoyl N'-myristoylpiperazine, N-butanoyl N'-undecanoylpiperazine, N-pentanoyl N'-caproyl cis-2,5-dimethylpiperazine, N-pentanoyl N'-caproyl tetra butylpiperazine, N,N'-dipentanoylpiperazine, N,N'-dicaproylpiperazine, N,N'-diheptanoyl trans-2,5-dimethylpiperazine, N-caproyl N'-octanoylpiperazine, N,N'-diheptanoylpiperazine, N-caproyl N'-lauroyl cis-2,5-dimethylpiperazine, N,N'-dicaproyl 2-methyl-5-propylpiperazine, N,N'-dioctanoyl trans-2,5-dimethylpiperazine, N-caproyl N'-myristoyl cis-2,5-dimethylpiperazine, N,N'-nonanoyl trans-2,5-dimethylpiperazine, N-undecanoyl N'-lauroylpiperazine, N,N'-dilauroylpiperazine, N,N'-dilauroyl cis-2,5-dimethylpiperazine, N,N'-dilauroyl tetrapropylpiperazine, N,N'-dimyristoyl trans-2,5-dimethylpiperazine, N-butanoyl N'-pentadecanoylpiperazine, N,N'-dipentadecanoyl cis-2,5-dimethylpiperazine and the like.

The acylated derivatives of the piperazine which according to this invention have been found suitable for enhancing the insecticidal activity of pyrethrin or allethrin insecticide toxicants can be prepared in numerous ways and under a variety of conditions. Thus, it is possible to effect the acylation of piperazine or an alkyl-substituted piperazine by a number of acylating agents including the acids, acid halides, acid amides and esters.

The following examples illustrate one method of preparing the compounds of the invention but it is to be understood that other methods can be employed and it is not intended that the invention be limited in scope to acylated piperazines prepared in any particular manner.

Example I

A mixture of 10.4 grams (0.26 mole) of sodium hydroxide pellets, 80 cubic centimeters of water and 11.4 grams (0.1 mole) of cis-2,5-dimethylpiperazine is treated with 32.5 grams (0.2 mole) caprylyl chloride (octanoyl chloride) with continuous stirring. The reaction flask is kept at room temperature or slightly below, and the addition completed in 1 hour. The reaction flask is heated to reflux for one hour, cooled and the two layers separated. Benzene is added to the organic layer which is then washed with water until the washings are neutral. The benzene layer is then removed, dried over anhydrous sodium sulfate and stripped at 1 millimeter pressure over a steam bath. The resulting reaction product is dioctanoyl cis-2,5-dimethylpiperazine, a white crystalline solid having a melting point of 52–54° C.

Example II

To a mixture of 5.2 grams (0.13 mole) of sodium hydroxide, 40 cubic centimeters of water and 5.7 grams (0.05 mole) of cis-2,5-dimethylpiperazine is added 17.6 grams (0.1 mole) of nonanoyl chloride (pelargonyl chloride). The nonanoyl chloride is added dropwise and the mixture continuously stirred. The mixture is heated at reflux temperature for approximately three hours. Upon cooling, the mixture is diluted with benzene and washed with water until neutral. The benzene layer is then removed and dried over anhydrous sodium sulfate. The benzene is removed by distillation to yield as a reaction product N,N'-dinonanoyl cis-2,5-dimethylpiperazine.

Any of the solvents commonly employed in insecticidal compositions as solvents for pyrethrin or allethrin insecticide toxicants can be employed in accordance with the present invention. These solvents include light petroleum fractions such as deodorized naphtha, kerosene, lubricating oil of light viscosity, aromatic hydrocarbons such as benzene, toluene; alkylated naphthalenes such as alpha methylnaphthalene; acetone and alcohol.

Depending on the specific reactants employed in their production, the compounds of the invention vary in nature from liquids to crystalline solids. The solid compounds are ordinarily not too soluble in the petroleum oils conventionally employed as bases for insecticidal compositions but can be readily dissolved when a secondary solvent is used. Only very small amounts of secondary solvents are needed. Among the secondary solvents which may advantageously be used to increase the solubility of the additives are alcohols such as ethyl, isopropyl, butyl; ketones such as acetone, methyl ethyl ketone; and aromatic solvents such as toluene, xylene and benzene.

Relatively small quantities of the disclosed diacylated piperazines are employed in insecticidal compositions to improve the killing effect of the pyrethrin and allethrin insecticide toxicants. Improvement in kill is obtained by addition of the disclosed compounds in amounts of about 50 milligrams per 100 cubic centimeters of solvent to about 2000 milligrams per 100 cubic centimeters of solvent. Preferred proportions of the additive are between 100 and 1000 milligrams per 100 cubic centimeters of solvent. The most useful proportions of pyrethrin are between about 20 to 2000 milligrams per 100 cubic centimeters of solvent.

In the following table, there is shown the enhancement of the insecticidal effect provided by representative compounds of the invention. The fly killing test employed was the Barnhart tower test, or as it is commonly known, the mist tower method for testing insecticides. The Barnhart spray tower utilized in the test is adapted for the controlled application of a settling mist and consists of a vertical spray tower of two concentric Celluloid cylinders. The dosage of spray is delivered by means of a DeVilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, volume #7, pages 105–115. The solvent employed was a deodorized light petroleum oil having a specific gravity of 0.78 and a distillation range of 380 to 480° F. In Example 6, the solvent comprised 95 cubic centimeters of petroleum oil and 5 cubic centimeters of ethanol.

| Example | Makeup/100 cubic centimeters solvent | | | Percent Dead 24 hours |
|---|---|---|---|---|
| | Pyrethrins, mg. | Allethrin, mg. | Compound | |
| 1 | 50 | | | 47.4 |
| | | | 1,000 mg. diheptanoyl cis 2,5 dimethylpiperazine. | 1.6 |
| | 50 | | do | 89.6 |
| | | 50 | do | 15.2 |
| 2 | | | 1,000 mg. dinonanoyl cis 2,5 dimethylpiperazine. | 1.4 |
| | 50 | | do | 68.2 |
| | | 50 | do | 58.6 |
| | | | 1,000 mg. dioctanoyl cis 2,5 dimethylpiperazine. | 2.2 |
| 3 | 50 | | 100 mg. dioctanoyl cis 2,5 dimethylpiperazine. | 72.6 |
| | 50 | | 500 mg. dioctanoyl cis 2,5 dimethylpiperazine. | 92.8 |
| | 50 | | 1,000 mg. dioctanoyl cis 2,5 dimethylpiperazine. | 94.4 |
| | 50 | | | 45.6 |
| | 50 | | 250 mg. dioctanoyl cis 2,5 dimethylpiperazine. | 72.4 |
| 4 | 50 | | 250 mg. dioctanoyl cis 2,5 dimethylpiperazine plus dioctanoyl trans 2,5 dimethylpiperazine. | 78.3 |
| | | 50 | | 33.4 |
| | | 50 | 300 mg. dioctanoyl cis 2,5 dimethylpiperazine. | 43.4 |
| 5 | | 50 | 500 mg. dioctanoyl cis 2,5 dimethylpiperazine. | 58.2 |
| | | 50 | 1,000 mg. dioctanoyl cis 2,5 dimethylpiperazine. | 75.2 |
| | 50 | | | 23.8 |
| | | | 1,000 mg. dioctanoylpiperazine. | 1.2 |
| 6 | 50 | | do | 69.6 |
| | 50 | | 500 mg. dioctanoylpiperazine. | 60.2 |
| | 50 | | 100 mg. dioctanoylpiperazine. | 34.2 |

It is seen from the above test results that the acylated piperazines embraced by this invention exert no appreciable insecticidal effect themselves but materially enhance the killing power of pyrethrin and allethrin insecticide toxicants. The use of the disclosed acylated piperazines in insecticidal compositions containing pyrethrin or allethrin insecticidal toxicants is advantageous economically inasmuch as it makes possible a substantial reduction in the amount required of the costly pyrethrin or allethrin toxicants.

Compositions prepared in accordance with our invention are useful in combating a variety of insecticide pests such as flies, moths, aphids, ants, roaches and the like.

Those modifications and equivalents which fall within the spirit of the invention and the scope of the appended claims are to be considered part of the invention.

I claim:

1. An insecticidal composition comprising an insecticide toxicant selected from the group consisting of pyrethrins and allethrin, a solvent therefor, and an acylated piperazine having the following formula:

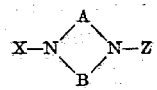

wherein A and B are selected from the class consisting of unsubstituted ethylene radicals and ethylene radicals having from 1 to 4 short chain alkyl substituents of not more than two carbon atoms each, X and Z are acyl radicals of aliphatic carboxylic acids containing from 3 to 15 carbon atoms.

2. The composition of claim 1 wherein the said solvent is a hydrocarbon solvent.

3. The composition of claim 1 wherein the said acylated piperazine is present in an amount from about 50 milligrams to 2000 milligrams/100 cubic centimeters of solution.

4. The composition of claim 1 wherein the X and Z substituents of the said acylated piperazine derivative contain between 6 and 10 carbon atoms.

5. An insecticidal composition comprising an insecticide toxicant selected from the group consisting of pyrethrins and allethrin, a solvent therefor, and the compound N,N'-dioctanoyl cis-2,5-dimethylpiperazine.

6. An insecticidal composition comprising an insecticide toxicant selected from the group consisting of pyrethrins and allethrin, a solvent therefor, and the compound N,N'-dioctanoylpiperazine.

7. An insecticidal composition comprising an insecticide toxicant selected from the group consisting of pyrethrins and allethrin, a solvent therefor, and the compound N,N'-diheptanoyl cis-2,5-dimethylpiperazine.

8. An insecticidal composition comprising an insecticide toxicant selected from the group consisting of pyrethrins and allethrin, a solvent therefor, and the compound N,N'-dinonanoyl cis-2,5-dimethylpiperazine.

References Cited in the file of this patent

UNITED STATES PATENTS

| 1,595,538 | Yamamoto et al. | Aug. 10, 1926 |
| 2,541,584 | Jacoby | Feb. 13, 1951 |